United States Patent [19]

Manca

[11] 4,297,407

[45] Oct. 27, 1981

[54] FINISH COMPOSITION FOR THE SPINNING OF HIGHLY CRIMPED CELLULOSE FIBERS USING A COMPOSITION CONT. FATTY ACID ESTER, ORGANIC PHOSPHORIC ACID ESTER, FATTY ACID ETHYLENE OXIDE COND. PROD. AND FATTY ACID SALT

[75] Inventor: Francesco Manca, Milan, Italy

[73] Assignee: Snia Viscosa Societa Nazionale Industria Applicazioni Viscosa S.p.A., Italy

[21] Appl. No.: 44,103

[22] Filed: May 31, 1979

[30] Foreign Application Priority Data

Jun. 5, 1978 [IT] Italy ............................ 24224 A/78

[51] Int. Cl.$^3$ .................. D06M 13/26; D06M 13/32; D06M 13/18; D03D 3/00
[52] U.S. Cl. ............................ 428/224; 8/115.6; 252/8.6; 252/8.8; 252/8.9; 428/288; 428/289; 428/362; 428/369; 428/393; 428/399; 428/401
[58] Field of Search ................ 252/8.6, 8.8, 8.9; 8/115.6; 428/362, 369, 224, 401, 288, 289, 393, 399

[56] References Cited

U.S. PATENT DOCUMENTS

| | | | |
|---|---|---|---|
| 3,101,323 | 8/1963 | Mervo et al. | 252/8.6 |
| 3,110,609 | 11/1963 | Bletzinger | 428/288 |
| 3,177,143 | 4/1965 | Lense | 252/8.9 |
| 3,336,222 | 8/1967 | Mims et al. | 252/8.9 |
| 3,926,816 | 12/1975 | Cohen et al. | 252/8.6 |
| 3,963,628 | 6/1976 | Park | 252/8.9 |
| 4,118,326 | 10/1978 | Login | 252/8.6 |
| 4,137,181 | 1/1979 | Hawkins | 252/8.9 |
| 4,169,062 | 9/1979 | Weipert | 252/8.9 |

*Primary Examiner*—Paul Lieberman
*Assistant Examiner*—H. J. Lilling
*Attorney, Agent, or Firm*—Wenderoth, Lind & Ponack

[57] ABSTRACT

A finish composition is disclosed for facilitating cotton type spinning of crimped cellulosic fibres comprising:
(A) about 10–30% of an ester of a fatty acid with fatty alcohols;
(B) about 8–15% of a partial ester of phosphoric acid, wherein part of the acid groups are free or salified;
(C) about 50–70% of an oxyalkylated fatty acid;
(D) up to 0.5% of a hydrosoluble organic or inorganic alkali metal salt; and
(E) the balance to 100% of an alkali metal salt of a fatty acid with 6–20 carbon atoms.

30 Claims, No Drawings

FINISH COMPOSITION FOR THE SPINNING OF HIGHLY CRIMPED CELLULOSE FIBERS USING A COMPOSITION CONT. FATTY ACID ESTER, ORGANIC PHOSPHORIC ACID ESTER, FATTY ACID ETHYLENE OXIDE COND. PROD. AND FATTY ACID SALT

BACKGROUND OF THE INVENTION

The Field of the Invention

The present invention refers to a composition adapted to facilitate the spinning of highly crimped cellulosic fibers, in particular of those produced with the viscose process, on machinery for cotton type fibers, and to a process for applying said composition on such cellulose fibers. The present invention further refers to the cellulosic fibers, in particular viscose and "Modal" spun fibers, treated with the said composition either in the production process or in the subsequent processing such as during application of a finish after dyeing or before the beating or carding stages.

It is known that many factors affect the workability of spun fibers, such as e.g. the morphology of its cross-section, the crimp, etc., but principaly its surface characteristics which are function of the application of the finish or are significantly influenced thereby. If an unsuitable finish is applied to the fibers neps are formed, filaments are broken, electrical charges are formed in the card; successively the card web and/or the bench slivers generally have a strong friction and slide with difficulty. The inverse may also be true, again due to the use of unsuitable finishes, whereby insufficient cohesion occurs and consequently fibers may fly off, winding on rolls, and other drawbacks may occur.

In particular the highly crimped fibers, both of the normal viscose type and of high tenacity and "Modal" (according to the ISO norms) type are considerably difficult to spin as pure and as blended fibers. The presence of numerous convolutions makes it very difficult to balance the friction between the fiber and the machine components and between the fibers themselves, with respect to the break tenacity thereof and to the requirement for good slideability of the semi-finished products like card web, draft ribbons, bench slivers in the cotton type transformation cycle.

To avoid the aforesaid drawbacks, the cellulosic fibers, and in particular viscose spun fiber, must be treated in the phase of the fiber production or before carding or after dyeing, with one or more substances which permit regular processing. These substances are notoriously applied in the form of solutions or fine aqueous emulsion, by spraying, dripping, bath immersion, etc., and consist of: mineral oils, oleines, surfactants, etc.

They have mainly the functions of:
imparting cohesion to the ribbon and the yarn,
permitting an appropriate sliding of fiber on fiber,
imparting to the yarn a low fiber-metal friction,
preventing the accumulation of electrical charges on the fibers
and on the other hand these substances:
must not produce disagreeable odors, and
should be adapted to be purged and be compatible with the dyes.

The substances used up to now as finishes proved unsuitable to perform all the functions set forth above and the higher the degree of crimp of fibers the less they proved efficient.

SUMMARY OF THE INVENTION

The applicant has now surprisingly found a particular composition (which will be hereinafter defined) which permits an excellent workability on all the machinery typical of the traditional and "Open end" cotton cycle (beater, card, drawing machine, ring and/or rotor spinning machine) and in general in any transformation from spun fiber to yarn, for all the cellulosic fiber crimped with a number of convolutions per cm from 2 to 8, and in particular for the MODAL fibers, wherein the phenomena due to the crimping are intensified to an extraordinary degree by the elastic properties of the fiber itself and consequently by the permanence of the convolutions under all the stresses deriving from the processing.

When the composition, according to the present invention, is used, the formation of electrical charges on the card and on the drawing machines is low, the ribbon is not bulky but has right softness and slideability of fibers on fibers, and further the ribbon, sliver and yarn are appropriately coherent.

The friction coefficient of the yarn on metal drops due to the composition of the invention to about 0.2-0.4, depending on the twists which are present. Such a value ensures good industrial processing on ring type spinning machines and in the subsequent operations.

According to the present invention a composition is provided adapted to facilitate the cotton type spinning of highly crimped cellulosic fibers, characterized by the fact that it comprises the following components:

(A) from 10 to 30%, preferably from 11 to 22%, by weight, of at least one compound having the formula:

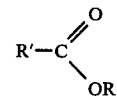

wherein R and R', equal to or different from one another, are straight or preferably branched chain alkyl radicals, containing all together from 8 to 40, preferably from 24 to 35 carbon atoms;

(B) from 8 to 15%, preferably from 10 to 12%, by weight, of at least one organic ester of phosphoric acid, wherein only a part of the acid groups have been esterified the remaining acid groups being free or salified, said ester being in monomeric or polymeric form;

(C) from 50 to 70%, preferably from about 55 to about 68%, by weight, of at least one product obtained by condensation of fatty acids with alkylene or polyalkyleneglycol oxides, wherein the alkylene moiety contains 2 or 3 carbon atoms;

(D) up to 0.5% by weight of organic or inorganic salts of alkali metals having a high solubility in water; and (E) as much as required to complete 100% of composition, preferably from 3 to 14%, and more preferably from 7 to 8% by weight, of at least one alkali metal salt of a fatty acid, containing from 6 to 20, preferably 18 carbon atoms.

The aforesaid percentages by weight of components (A), (B), (C), (D) and (E) are referred to the dry product.

According to the present invention, by highly crimped cellulosic fibers are preferably understood those of the viscose type and those of "MODAL" type according to the definition indicated in the ISO R 2076/1977 norm.

As it results from the foregoing description of the composition component (D) may also be absent.

DESCRIPTION OF THE PREFERRED EMBODIMENT OF THE INVENTION

According to the present invention, there may be preferably employed as component (A), for example, ethyl, butyl, lauryl, isobutyl, isooctyl, tridecyl stearate, oleate or laurate; esters of stearic acid prepared by saponification, with butyl or isobutyl alcohol or branched alcohols containing from 6 to 8 or 12 to 14 carbon atoms are preferably employed.

The organic ester of phosphoric acid employed as component (B), is preferably the reaction product of a straight or branched chain, primary or secondary aliphatic fatty alcohol containing from 2 to 20, preferably 10 to 14 carbon atoms, and phosporic anhydride, the reaction being carried out in such a way as to have at the end free acid groups, which, subsequently, are partially or totally neutralized with a base, preferably an organic base containing nitrogen or a basic compound of an alkali metal.

The fatty acids used for the formation of the ester may also be firstly condensed with 1 to 20 mols of ethylene and/or propylene oxide per mol of acid. The bases which partially or totally salify the acid groups are organic compounds containing nitrogen such as: morpholine, monoethanolamine, diethanolamine, triethanolamine, higher molecular weight ethanolamines, sodium or potassium basic compounds.

As component (B), according to the invention, the phosphoric ester of hexyl, 2-ethylhexyl, lauryl, ethyl, stearic or oleic alcohol, partially or totally salified with one of the aforesaid bases, may for instance be employed.

These compounds have in part the property of conducting the electrical charges even in the presence of a small amount of water or in the absence of water. They can therefore discharge the static electricity which accumulates by friction when the superficial water is completely or almost completely evaporated because of the heat generated by the friction itself. Said phosphoric esters further have a considerable wetting power, their presence lowers the emulsion fiber interface tension and may maintain the wettability of the spun fiber with the emulsion. In conclusion, said phosphoric esters perform an antistatic, wetting and surfactant action. With respect to the sulfonated vegetable oils, normally used by the known art, they have a better mobility of the organic ions and lower content of salts which may be harmful. Finally, the fact that in their molecule several groups which may be salified are present confers them a certain ability of controlling the pH and contributes to neutralize any inner fiber acidity.

With reference to component (C), it is known from the literature that the oxyalkylation of fatty acids results in mixtures containing mainly monoesters, diesters and polyglycols. The amount of said compounds depends on the conditions of the process in the condensation of fatty acids with alkylene oxide. The applicant has further surprisingly found that alkylenated fatty acids containing at least 60%, preferably at least 70%, of monoesters have better lubricating, cohesion promoting action than the products containing about 45-50% of monoester, 35% of diester and 15-20% of polyglycol.

However, according to the invention, fatty acids, oxyalkylenated with any amount of monoester, diester, polyglycol, may also be used. The preferred fatty acids have an aliphatic chain of 8 to 20 carbon atoms and 3 to 20 mols of ethylene or propylene oxide.

Non limiting examples of compounds which may be employed as component (C) according to the invention are: the condensation products of ethylene oxide, propylene oxide or polyalkyleneglycols with coconut fatty acids, lauric acid, myristic acid, palmitic acid, stearic acid, tall oil fatty acids.

As component (D), according to the invention, sodium or potassium orthophosphate, sodium or potassium pyrosphosphate, sodium or potassium benzoate may be employed.

Component (D) is added to reinforce the antistatic character of the finish.

As component (E), according to the invention, sodium or potassium salts of mixtures of natural or synthetic fatty acids, containing at least 70% of oleic acid, may be employed.

The composition according to the invention is suitably prepared by mixing the various components in the presence of small amounts of water. Preferably to 2 parts of a dry mixture constituted of components (A), (B), (C), (E) and optionally (D) according to the invention one part of water is added, the mixture thus obtained is heated under stirring, e.g. at a temperature comprised between 60° and 80° C. until a homogeneous paste is obtained. Said paste is easily dispersible in water.

The composition according to the invention creates at the interface between fiber and air a lubricating cohesion promoting, electrical charges conducting layer in such a way that both the dynamic and static friction are low although the fibers are cohesively bound to a very good degree.

The composition according to the invention may be employed both by itself and with the addition of hydrophilic or hygroscopic substances such as e.g. ethyleneglycol, diethyleneglycol, sorbitol, lithium chloride, etc. which may act both as moisture regulators and as solvents for saline substances and therefore may increase the mobility of the ions which conduct the electrical charges in particular when the fiber surface loses water because of the heat generated by friction.

In another embodiment thereof the present invention provides a process for applying the composition according to this invention on a cellulosic fiber, in particular of high crimp viscose type, in such a way as to facilitate the cotton type spinning of said cellulosic fibers, in particular viscose and "MODAL" spun fibers, characterized by the fact that said composition is employed, optionally in the form of a paste, in an amount, calculated as dry, variable from 0.1 to 0.8%, preferably from 0.2 to 0.4 by weight with the respect to the fiber. The bath temperature may conveniently vary from 20° to 80° C., preferably about 60° C.

It is possible with the composition according to the present invention, to obtain an emulsion or mother solution in water, at about 10%–20% of dry substance, which is to be continuously charged to the diluted emulsion of the same applied on the fiber, being essential for the purposes of the invention that the pH be kept constant.

It is important that the finish should be capable of wetting the spun fiber for a better penetration between fibers. With the composition according to the invention the best wettability and mounting are obtained.

By the treatment with the composition according to the invention it is possible to card the spun fibre at the highest speeds while obtaining the maximum individualization of the fibers and concurrently a very low number of neps. The particular effect of the finish causes the spun fiber to produce card webs, ribbons and slivers having a very good cohesion. A combined effect of sliding of fiber on fiber and cohesion is therefore obtained which develops in one direction or the other according to the fiber spinning phase in order to provide the best workability.

It is therefore possible to work with the most modern high productivity cards and to achieve the maximum of their hourly production (40 kg/h) while maintaining the best quality level of the semi-finished products (ribbons, slivers) and especially on the yarn.

While with the known compositions it was not possible to exceed 20–25 kg/h and already "dirty" card webs were obtained, since they contain 2.5–3 neps per 100 square inches, with the composition according to the present invention it is now possible to reach a speed of 25 to 40 kg/h and the card web remains clean as the number neps remains between 0.5 and 1.5 per 100 square inches.

According to a further embodiment thereof the present invention provides cellulosic fibers, in particular the highly crimped viscose and "MODAL" spun fibers, having a number of convolutions from 2 to 8 per cm, a count from 1.2 to 3 d.tex, a length up to 60 mm, treated with the composition comprising components (A)+(B)+(C)+(E), and optionally (D), according to the invention, optionally in the form of a paste.

According to a still further embodiment thereof the present invention provides semi-finished products, in particular card webs and ribbons, drawing machine ribbons and bench slivers obtained from the cellulosic fibers treated with the composition according to the present invention.

The following examples illustrate but do not limit the scope of the present invention. Unless otherwise specified the parts are by weight.

EXAMPLE 1

The composition is suitably prepared by mixing
7.580 p of a sodium soap of fatty acids constituted of at least 70% of oleic acid
11.680 p of a phosphoric ester constituted of mixture of monoester and diester of $C_{10-12}$ alcohols partially salified with morpholine
64.460 p of stearic acid derived from saponification, oxyethylated with an amount of 8–9 mols of ethylene oxide per mol of stearic acid
16.280 p of an ester derived from saponification stearic acid and branched $C_{6-8}$ alcohols
in the presence of small amounts of water, preferably 2 parts of dry mixture per 1 part of water.

The mixture thus obtained is heated under stirring at 60°–80° C. until a homogeneous paste is obtained. Said paste is easily dispersible in hot water.

To apply the composition on high crimped cellulosic fibers, the aforesaid solid paste is dissolved in water at a temperature comprised between 60° and 70° C. so, as to obtain an emulsion having 10 to 20% of dry substance, called mother solution.

Said mother solution goes to continuously feed a circulating emulsion solution constituted of 4.5 p of the aforesaid dry paste, and 1000 p of water, having a pH of 7–8 maintained by addition to the circulating bath in the finishing section of the application machinery, of a suitable amount of acetic or sulphuric acid. It is essential to the aims of the invention that the pH of the bath be kept constant, e.g. by graphic control. In the case of the fiber production the circulating solution is applied by dripping it on the spun fiber layer which is carried forward on a conveyor ribbon.

The operation is carried out in such a way that the dry spun fiber absorbs a percentage of finish which is about 0.4% by weight on the fiber. (The amount of finish absorbed by the fiber may be determined in a Soxlet by extraction with solvents, e.g. a 1:1 mixture of cyclohexane ethyl alcohol).

EXAMPLE 1a

A highly clean card web containing only 0.5 neps per 100 square inches is obtained from a crimped viscose spun fiber having a count of 1.7 d.tex, a length of 38–40 mm., 4.2 convolutions per cm and treated with the finish obtained according to Example 1 (operating on a carding machine at speed of 30 kg/h).

The electrostatic charges developed in the course of the processing are minimal: 450 Volts measured on the produced web.

The static and dynamic friction, measured on the drawing machine sliver (II passage) by the Rotschild R 2020 apparatus, are respectively of 140 and 120 m.

The yarn/metal friction coefficient, measured on the pure yarn having a title of 15 Tex and a twist coefficient of 3.5 per inch, is limited to alpha=0.23 (determined with Rotschild tensiometer).

The aforesaid good friction values assure the possibility of laminating (thinning) the ribbons and the slivers with the highest regularity.

EXAMPLE 1b

From a crimped "MODAL" fiber having the title d.tex of 1.5, a length of 38–40 mm., 6 convolutions per cm and treated with 0.4% (on the fiber) of the finish obtained according to Example 1, a highly clean card web, containing only 0.75 neps per 100 square inches is obtained, operating on the carding machinery at the speed of 30 kg/h.

The electrostatic charges developed in the course of the processing are minimal: 600 Volts measured on the produced web.

The static and dynamic friction, measured on the drawing machine sliver (II passage) with the Rotschild R 2020 apparatus, are respectively of 160 and 140 m.

The yarn/metal friction coefficient, measured on the pure yarn having a title of 15 Tex and twist coefficient of 3.5 per inch, is limited to alpha=0.32 (determined with the Rotschild tensiometer).

The good values of the aforesaid frictions assure the possibility of laminating (thinning) the ribbons and slivers with the highest regularity.

EXAMPLE 1c

From a crimped "MODAL" fiber having a title of 1.5 d.tex, a length of 38–40 mm., 6 convolutions per cm and treated with 0.4% (on the fiber) of the finish obtained according to Example 1, a highly clean card web containing only 1.0 neps per 100 square inches is obtained by operating on carding machinery at a speed of 40 kg/h.; the electrostatic charges developed in the course of the processing are minimal: 680 Volts measured on the produced web.

The static and dynamic friction, measured on the drawing machine sliver (II passage) with the Rotschild R 2020 apparatus, are respectively of 160 and 140 m.

The yarn/metal friction coefficient, measured on the pure yarn having a title of 15 Tex and twist coefficient of 3.5 per inch, is limited to alpha=0.23 (determined with the Rotschild tensiometer).

The aforesaid good friction values assure the possibility of laminating (thinning) the ribbons and slivers with the highest regularity.

We claim:

1. A composition adapted to facilitate the cotton type spinning of highly crimped cellulosic fibers comprising the following components:

(A) from 10 to 30%, by weight of at least one compound having the formula:

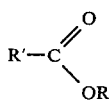

wherein R and R', equal to or different from one another are straight or branched chain alkyl radicals, comprising all together 8 to 40 carbon atoms;

(B) from 8 to 15%, by weight of at least an organic ester of phosphoric acid, wherein only a part of the acid groups have been esterified, the remaining acid groups being free or salified, said ester being in the form of a monomer or a polymer;

(C) from 50 to 70%, by weight of at least one product obtained by the condensation of fatty acids with alkylene oxide or polyalkyleneglycols, wherein the alkylene moiety contains 2 or 3 carbon atoms;

(D) up to 0.5% by weight of organic or inorganic alkali metal salts having a high solubility in water; and (E) the amount required to make up 100% of an composition, of at least one alkali metal salt of a fatty acid containing from 6 to 20, preferably 18 carbon atoms.

2. Composition according to claim 1 comprising from about 11 to about 22% of said component (A), from about 10 to about 12% of said component (B), from about 55 to about 68% of said component (C), and from about 3 to about 14% of said component (E), said percentages being by weight on the total composition.

3. Composition according to claim 1, wherein as component (A) an ester of stearic acid with an alcohol selected from butyl, isobutyl, and branched alcohols containing from 6 to 8 or 12 to 14 carbon atoms, is employed.

4. Composition according to claim 1, wherein as component (B) the reaction product between an aliphatic alcohol containing 2 to 20 carbon atoms, and phosphoric anhydride, is employed, the said reaction product also comprising free acid groups, which are subsequently partially or totally neutralized with a base selected from a nitrogen containing organic base and an alkali metal base.

5. Composition according to claim 4, wherein said alcohol is a fatty alcohol with from 10 to 14 carbon atoms.

6. Composition according to claim 4, wherein the aliphatic alcohol is firstly condensed with 1 to 20 mols or ethylene oxide and/or propylene oxide.

7. Composition according to claim 4, wherein said nitrogen containing organic base is selected from the group comprising morpholene, monoethanolamine, diethanolamine, triethanolamine and mixtures thereof.

8. Composition according to the claim 4, wherein said alkali metal base is a sodium or potassium compound.

9. Composition according to the claim 4, wherein said component (B) comprises a mixture of monoesters and diesters of phosphoric acid with primary or secondary, straight or branched chain alcohols containing 4 to 6, 10 to 12 or 14 to 16 carbon atoms, said esters having free acid groups partially or totally salified with a base selected from morpholine, monoethanolamine, diethanolamine and triethanolamine.

10. Composition according to claim 9, wherein by the mixture of phosphoric esters is subjected to oxyethylation before salification.

11. Composition according to claim 1, wherein as component (C) at least one condensation product of ethylene oxide, propylene oxide or a polyalkyleneglycol, with at least one fatty acid containing 8 to 20 carbon atoms is employed, the molar ratio between said oxide or glycol and said acid being of about 3–20:1.

12. Composition according to claim 11, wherein said fatty acid is selected from the group consisting of lauric, stearic and oleic acids.

13. Composition according to claim 11, wherein said component (C) comprises at least 60% of monoesters.

14. Composition according to claim 1, wherein said component (D) is selected from the group consisting of sodium phosphate, potassium phosphate, potassium pyrophosphate and sodium benzoate.

15. Composition according to claim 1, wherein said component (E) is a sodium or potassium salt of mixtures of fatty acids containing at least 60% of oleic acid.

16. Process for the preparation of a composition according to claim 1, wherein components (A), (B), (C), (E) with or without (D) are mixed, whereby a dry mixture is obtained, then water is added in a weight ratio between dry mixture and water of about 2:1, and the mixture is heated to 60°–80° C. under stirring, whereby a paste is obtained.

17. Process for the application of a composition according to claim 1 on a cellulosic fiber so as to facilitate the cotton type spinning of said cellulosic fibers, wherein said composition is employed, in an amount between 0.1 to 0.8%, by weight as dry substance, with respect to the fiber.

18. Process according to claim 17, wherein the composition is applied in form of a paste prepared by mixing components (A), (B), (C) and (E) with or without (D), whereby a dry mixture is obtained, then water is added in a weight ratio between dry mixture and water of about 2:1, and the mixture is heated to 60°–80° C. under stirring, whereby a paste is obtained.

19. Process according to claims 17 or 18, wherein the said composition is applied at a temperature of from 20° to 80° C. at a constant pH.

20. Aqueous mother emulsion or solution containing from 10 to 20% as dry substance of the composition according to claim 1.

21. Process according to claim 17 wherein said cellulosic fiber is highly crimped viscose.

22. Process according to claim 17 wherein said cellulosic fiber is "Modal."

23. A highly crimped cellulosic fiber having from 2 to 8 convulutions per cm, a count of from 1.2 to 3 d.tex, a length of up to 60 millimeters and comprising 0.1 to 8% by weight, with respect to the fiber of a composition comprising the following components:

(A) from 10 to 30%, by weight of at least one compound having the formula:

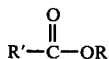

wherein R and R', equal to or different from one another, are straight or branched chain alkyl radicals, comprising all together 8 to 40 carbon atoms;

(B) from 8 to 15%, by weight of at least an organic ester of phosphoric acid, wherein only a part of the acid groups have been esterified, the remaining acid groups being free or salified, said ester being in the form of a monomer or a polymer;

(C) from 50 to 70%, by weight of at least one product obtained by the condensation of fatty acids with alkylene oxide or polyalkyleneglycols, wherein the alkylene moiety contains 2 or 3 carbon atoms;

(D) up to 0.5% by weight of organic or inorganic alkali metal salts having a high solubility in water; and (E) an amount required to make up 100% of the composition, of at least one alkali metal salt of a fatty acid containing from 6 to 20, preferably 18 carbon atoms.

24. The cellulosic fiber of claim 23 which is of the viscose or "MODAL" type.

25. A card web produced from the cellulosic fiber of claim 23.

26. A ribbon produced from the cellulosic fiber of claim 23.

27. A drawing machine ribbon produced from the cellulosic fiber of claim 23.

28. Bench slivers produced from the cellulosic fiber of claim 23.

29. A card web or ribbon obtained at a speed of from 25 to 40 kg/H, from the cellulosic fiber of claim 23, said card webs or ribbons containing from 0.5 to 1.5 neps per 100 square inches.

30. Ribbons and slivers produced by the card webs of claim 29.

* * * * *